(12) United States Patent
Roring et al.

(10) Patent No.: US 8,348,303 B1
(45) Date of Patent: Jan. 8, 2013

(54) AIRBAG COVER HINGE WITH FORCE-ABSORBING SYSTEM

(75) Inventors: Albert Roring, Gronau-Epe (DE); Michael Grimmelt, Gronau-Epe (DE)

(73) Assignee: K.L. Kaschier-und Laminier GmbH, Gronau-EPE (DE)

(*) Notice: Subject to any disclaimer, the term of this patent is extended or adjusted under 35 U.S.C. 154(b) by 0 days.

(21) Appl. No.: 13/605,426

(22) Filed: Sep. 6, 2012

Related U.S. Application Data

(63) Continuation of application No. 12/527,703, filed as application No. PCT/EP2008/001312 on Feb. 20, 2008.

(30) Foreign Application Priority Data

Feb. 21, 2007 (DE) .......................... 10 2007 009 058
Nov. 28, 2007 (DE) ..................... 20 2007 016 718 U

(51) Int. Cl.
*B60R 21/215* (2006.01)

(52) U.S. Cl. ..................................... 280/728.3; 280/732
(58) Field of Classification Search ............... 280/728.1, 280/728.3, 731–732
See application file for complete search history.

(56) References Cited

U.S. PATENT DOCUMENTS 8,157,289 B2 * 4/2012 Bittner et al. .............. 280/728.3

* cited by examiner

*Primary Examiner* — Ruth Ilan
*Assistant Examiner* — James English
(74) *Attorney, Agent, or Firm* — Patricia M. Mathers

(57) ABSTRACT

An airbag cover hinge has load-absorption capabilities that provide a controlled release of the airbag cover during airbag deployment. The hinge has a textile base structure formed of longitudinal and cross threads. High strength, load-bearing stop threads are integrated into the textile base structure. When the airbag deploys, the longitudinal threads eventually tear, while the stop threads extend in length and function as a hinge that holds the torn parts of the textile base structure together.

15 Claims, 3 Drawing Sheets

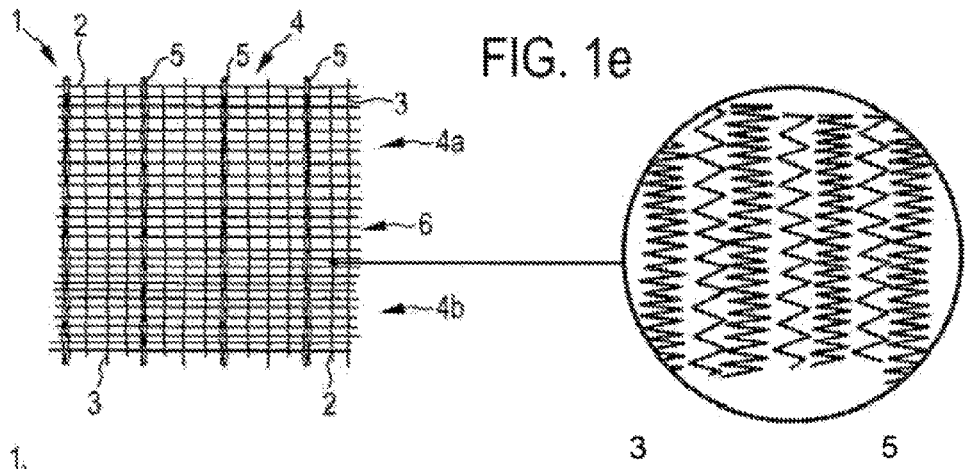
FIG. 1e
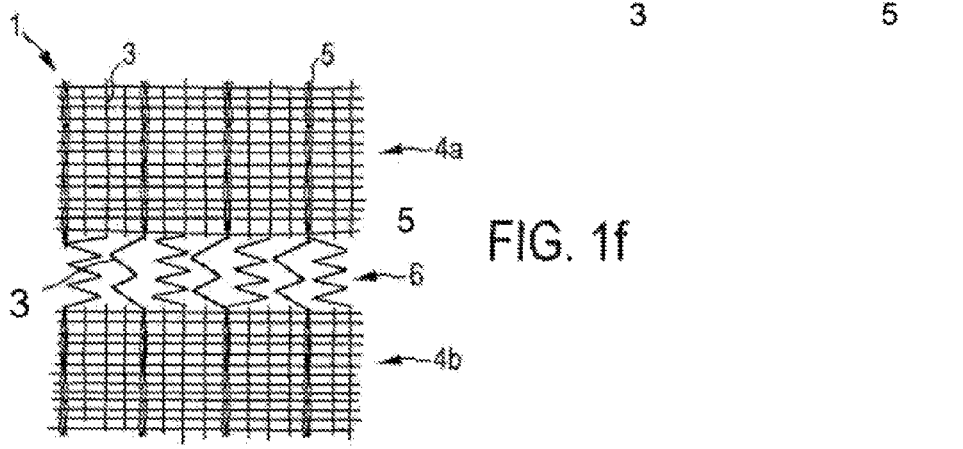
FIG. 1f
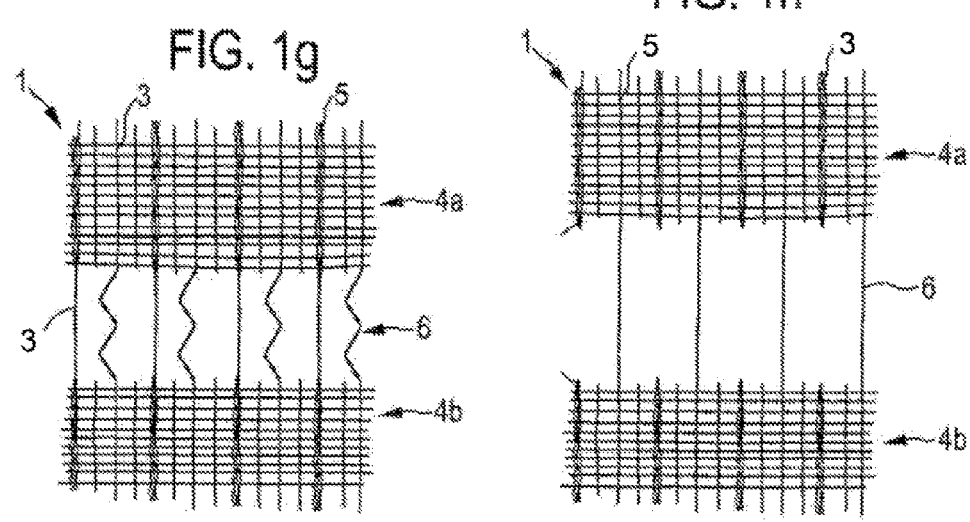
FIG. 1g
FIG. 1h

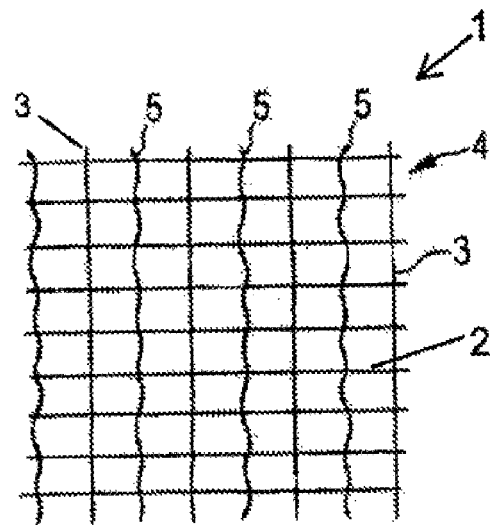
FIG. 2
FIG. 3
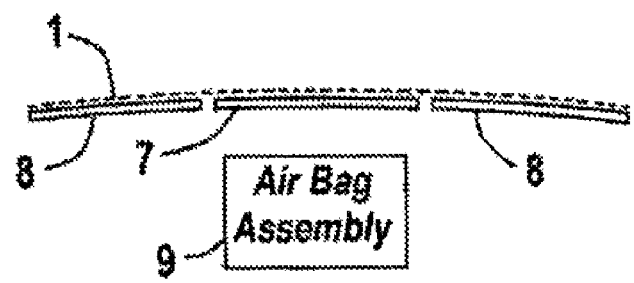

AIRBAG COVER HINGE WITH FORCE-ABSORBING SYSTEM

FIELD OF THE INVENTION

The invention relates to an airbag cover hinge having a textile hinge that can be connected both to the airbag cover and to a support carrying the airbag cover.

BACKGROUND OF THE INVENTION

When an airbag deploys, the airbag cover opens to allow the airbag to expand into the passenger space. The airbag cover hinge serves to guide the airbag cover on opening and to prevent the cover from flying in an uncontrolled manner into the passenger space.

U.S. Pat. No. 7,165,781 discloses an airbag cover hinge of knitted or woven fabric. The forces acting on the airbag cover hinge vary, as a function of the weight of the airbag cover and/or airbag. For example, the heavier the airbag cover or airbag, the greater the forces acting on the hinge. The hinge serves a dual function: first to ensure that the airbag cover opens quickly and easily when the airbag deploys and second, to ensure that the airbag cover does not break free from all restraints, so as to fly into the passenger space and possibly cause injury to someone.

Prior art hinges for airbag cover that are configured as woven fabric or knitted fabric can tear, that is, fail, under unfavorable conditions.

What is needed, therefore, is a hinge for an airbag cover that allows easy opening of the airbag cover upon deployment, yet securely prevents a tearing or loosening of the hinge. What is further needed is such a hinge that is cost-effective to produce.

BRIEF SUMMARY OF THE INVENTION

The invention is an airbag cover hinge that provides a multistage controlled release of the airbag cover. The hinge has a textile base structure. Load-bearing or "stop" threads are integrated as load-absorption threads into the textile base structure, which is a fabric constructed of longitudinal threads and cross threads. The stop threads extend generally parallel to the longitudinal threads and have greater resistance to tearing and a greater length than the longitudinal threads.

The hinge according to the invention integrates two systems, i.e., a first system that tears whenever a predetermined tension is exceeded in order to take up most of the tension, and a second system which allows a defined opening of the airbag cover (opening angle) with a secure hold on the cover.

The textile base structure is advantageously configured as knitted fabric so as to be cost effective and provide optimal handling.

The stop threads are aligned generally parallel to the direction of force that is exerted on the hinge during deployment, and ideally uniformly distributed over the textile base structure, so as to provide an adequate quantity of stop threads, even then, for example, when the hinges are cut or stamped from a larger piece of fabric.

One feasible design is a sequence or repeating array of two longitudinal threads of the textile base structure and a stop thread (load absorption thread), this sequence, however, may be adapted to correspond to the specific configuration of the airbag cover.

In an advantageous embodiment, the textile base structure is configured such that the base structure tears, while the stop threads do not. The stop threads have a greater length than the longitudinal threads and may be incorporated into the textile base structure, for example, in a meandering, zigzag, tubular, arched, corrugated and/or self-overlapping layout, such that the stop threads have a "storage area" that allows the stop threads to expand in length. The portion of the stop threads in the storage area that may be placed substantially transversely and/or longitudinally to the direction of pull.

The hinge according to the invention may be embedded in a two-dimensional textile fabric, such that when deployment forces are exerted on the cover hinge, the textile base structure tears or opens away from the two-dimensional textile fabric, so as to attenuate the deployment forces on the cover to some degree and, at the same time, to define the path of travel for the airbag flap upon opening.

BRIEF DESCRIPTION OF THE DRAWINGS

The present invention is described with reference to the accompanying drawings. In the drawings, like reference numbers indicate identical or functionally similar elements.

FIG. 1e illustrates two thread systems integrated into the textile base structure, FIG. 1f illustrates the initial opening up of the storage area in the process of airbag deployment.

FIG. 1g illustrates a continuing opening up of the storage area.

FIG. 1h illustrates the final stage of the opening up of the storage area, showing longitudinal threads severed and stop threads functioning as a hinge and holding the two parts of the textile base structure together.

FIG. 2 illustrates a textile base structure in which the storage area is distributed over the length of the hinge.

FIG. 3 is a schematic illustration of the airbag cover and hinge.

DETAILED DESCRIPTION OF THE INVENTION

Figure 1A:
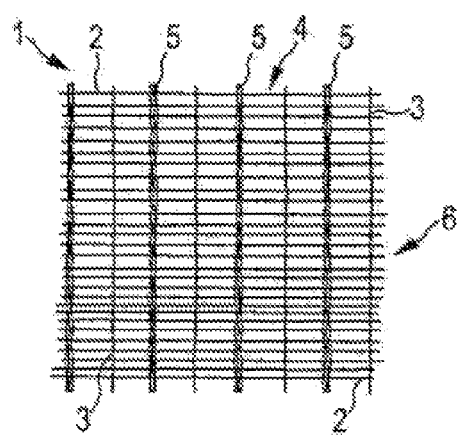
FIG. 1a is a schematic illustration of the textile base structure according to the invention.

FIGS. 1a to FIG. 1d illustrate an airbag cover hinge 1 according to the invention, which comprises a textile base structure 4 constructed of longitudinal threads 3 and cross threads 2. In the embodiment shown, the textile base structure is a knitted fabric. The hinge 1 serves to secure a cover 7 that is incorporated into some support system 8 that encloses an air bag assembly 9 as illustrated schematically in FIG. 3.

High-strength load-bearing or stop threads 5, such as, for example, dtex 1100, are integrated into this textile base structure 4. The textile base structure 4 itself, comprising the longitudinal threads 3 and cross threads 2, may be constructed of polyester and/or other suitable materials, and particularly, is constructed to have less strength than the stop threads 5, in other words, at least the longitudinal threads 3 are designed to tear at loads that the load-bearing stop threads can withstand.

The hinge 1 further comprises a control means 6 to control the release of the airbag cover 7 during deployment of the airbag. The control means includes stop threads 5 that are incorporated into the textile base structure 4 and also a storage capacity or area 6. The stop threads 5 are aligned generally parallel to the direction of tension acting on the hinge upon deployment, but a portion of the stop threads 5 has a storage capacity that allows the threads 5 to expand in length.

Figure 1B:
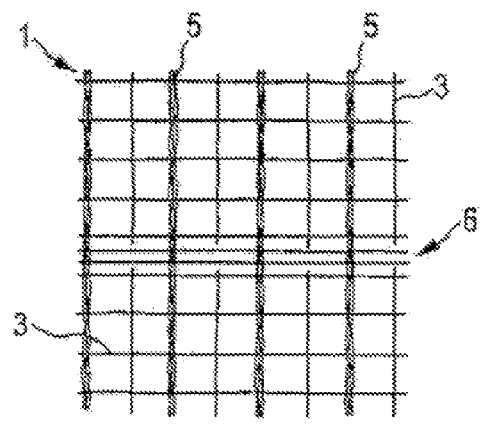
FIG. 1b illustrates the hinge under tension, with the storage area opening up.

The textile base structure 4 and the control means 6 are shown in FIGS. 1b-1e as being part of a contiguous structure. The stop threads 5 in the storage area 6 have an additional length that may be laid out in a direction generally transverse to the direction of force exerted by deployment. FIG. 1b illustrates an initial airbag deployment stage with the storage area 6 beginning to open up. This stretching of the storage area 6 operates to enable a load-absorption function of hinge 1. As the storage area 6 opens up, the strong stop threads 6 and control or restrain the movement of the airbag flap over its possible travel path.

Figure 1C:
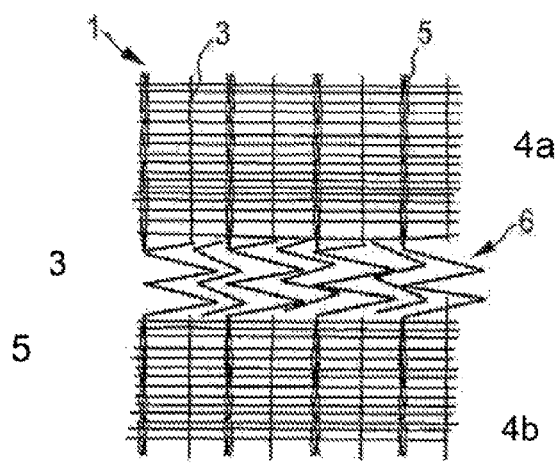
FIG. 1c shows stop and longitudinal threads in the storage area.
Figure 1D:
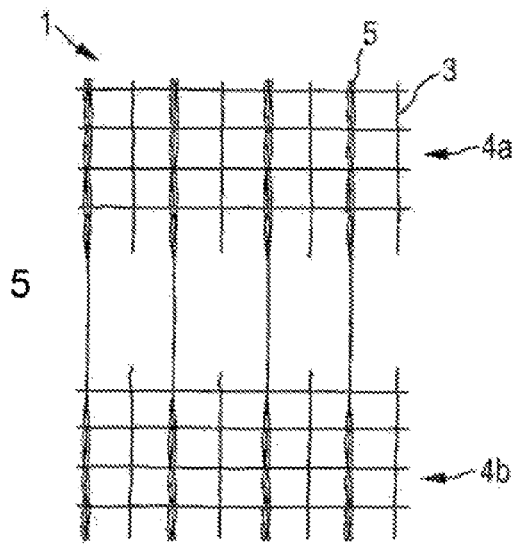
FIG. 1d shows the longitudinal threads torn apart and the stop threads holding two parts of the textile base structure together.

Following actuation of the airbag, the airbag cover 7 opens and the textile base structure 4 incorporated in the vicinity of the airbag cover hinge 1 stretches to such an extent that the longitudinal threads 3 of the textile base structure tear apart. The process of applying load to the hinge is shown schematically in FIGS. 1c and 1d. The textile base structure 4 begins to stretch in the vicinity of the storage area 6. In the embodiment of FIG. 1c, for example, the stop threads 5 and the longitudinal threads 3 are incorporated into the textile base structure as a folded, meandering, or zigzag inlay of the threads. As the force from deployment continues to act on the hinge 1, the threads 5 and 3 expand in length. Eventually, the longitudinal threads 3 tear, as shown in FIG. 1d, leaving the high-strength stop threads 5 to function as a hinge and hold the two parts 4a and 4b of the textile base structure 4 together. A complete tear of the airbag cover hinge 1 is securely prevented by the high-strength formation of the stop threads 5. The control means or storage area 6 releases the travel necessary to open the airbag cover, yet, at the same time, prevents unwanted tearing off and uncontrolled release of the airbag cover.

The total strength of the airbag cover hinge 1 is determined by the number of stop threads 5 and/or their strength properties. i.e., their resistance to tearing. In a textile embodiment, it is possible to create a repeating array across the width of the airbag cover hinge 1 of two longitudinal threads 3 and one stop thread 5, the stop thread being attached to the longitudinal threads of the textile base structure 4. It is also possible, as shown in FIG. 1d, to provide the stop threads 5 as an overlay with the longitudinal threads 3. FIG. 1e illustrates a hinge 1, in which the threads 3 and 5 are incorporated into the textile base structure as a repeating array. It should be understood, however, that the actual embodiments may be adapted to achieve the desired resistance to tearing for the specific application.

The maximal expansion range of the airbag cover hinge 1, i.e., the distance between the portions 4a and 4b of the base structure 4, is defined by the length of the stop threads 5 in the storage area 6. The number and resistance to tearing of the stop threads 5 is selected, such that the stop threads 5 continue to absorb residual forces after the expanded textile base structure 4 has torn (multistage process).

FIGS. 1f and 1g show that both the stop threads 5 and the longitudinal threads 3 can have different lengths relative to one another so as to execute dual-stage or multistage load absorption on opening. It is also possible to incorporate stop threads 5 having different lengths and/or strength properties, so as to further enhance the multistage load absorption function of the hinge 1.

In another embodiment, such as the one shown in FIG. 2, the stop threads 5 have a meandering or zigzag lay over the length of the textile base structure 4, in other words, the control means or storage area 6 is configured over the entire length of the stop threads 5. The meandering or zigzag stop threads/load absorption threads extend such that the storage expansion and the strength of the stop threads 4 define the load absorption by the hinge 1 in the axis of rotation of the airbag flap, enable the airbag flap to open, and then prevent the torn-apart portions 4a and 4b of the textile base structure 4 from fully detaching from the hinge 1.

What is claimed is:

1. An airbag cover hinge comprising:
   a textile base structure constructed of a plurality of longitudinal threads that extend in a direction parallel to a direction of force that is exerted on the textile base structure when an airbag cover opens, and a plurality of cross threads that extend transverse to the longitudinal threads; and
   a control means for controlling a release of the airbag cover, the control means including a plurality of stop threads integrated into the textile base structure;
   wherein the airbag hinge is attached to one side of the airbag cover;
   wherein, when an airbag deploys, the longitudinal threads tear apart and the stop threads extend in length, such that the stop threads serve to guide and restrain a travel path of the airbag cover.

2. The air-bag cover hinge of claim 1, the textile base structure is a knitted fabric.

3. The air-bag cover hinge of claim 1, wherein the stop threads are aligned generally parallel to the tension of the air-bag cover hinge.

4. The air-bag cover hinge of claim 1, wherein the stop threads are distributed uniformly over the textile base structure.

5. The air-bag cover hinge of claim 1, the textile base structure and the stop threads forming a repeating alternating arrangement of at least one longitudinal thread and a stop thread.

6. The airbag cover hinge of claim 5, wherein the repeating alternating arrangement includes two longitudinal threads and a stop thread.

7. The air-bag cover hinge of claim 1, wherein the textile base structure is movable relative to the stop threads.

8. The air-bag cover hinge of claim 1, wherein the control means is a storage area that provides an expansion length to at least the stop threads.

9. The airbag cover hinge of claim 8, wherein the storage area is placed in a predetermined section of the textile base structure and the stop threads extend into the storage area substantially transversely or longitudinally to the tension exerted on the airbag cover hinge.

10. The air-bag cover hinge of claim 1 wherein the control means is distributed along the textile base structure, such that the stop threads include an expansion length along a length of the textile base structure, so as to allow the stop threads to expand in length relative to the textile base structure.

11. The airbag cover hinge of claim 10, wherein the expansion length is provided as a meandering lay of the stop threads.

12. The airbag cover hinge of claim 10, wherein the expansion length is provided as a zigzag lay of the stop threads.

13. The airbag cover hinge of claim 10, wherein the expansion length is provided as an overlapping lay of the stop threads.

14. The air-bag cover hinge of claim 1, wherein the textile base structure is imbedded in an essentially two-dimensional construction of a knitted fabric.

15. The air-bag cover hinge of claim 1, wherein the control means provides at least a dual-stage load absorption of the airbag cover, a first stage allowing the longitudinal threads of the textile base structure to tear apart and a second stage wherein the stop threads serve as a hinge about which the airbag cover rotates and restrain the airbag cover from breaking loose from the hinge.

* * * * *